United States Patent
Galginaitis et al.

(10) Patent No.: US 11,720,842 B2
(45) Date of Patent: Aug. 8, 2023

(54) SYSTEM AND METHOD FOR IDENTIFYING COMPARABLES

(71) Applicant: KPMG LLP, New York, NY (US)

(72) Inventors: Steven Galginaitis, Bradenton, FL (US); Michel Braun, Düsseldorf (DE); Matthew Cretcher, Dallas, TX (US); Brian Shea, La Grange, IL (US); Mitchell Miller, Seattle, WA (US); Rebecca Reitz, Seattle, WA (US); Jillian Schleicher, Seattle, WA (US); John Hyung Lee, New York, NY (US); Marc Daniel Allen, Hillsboro, OR (US)

(73) Assignee: KPMG LLP, New York, NY (US)

( * ) Notice: Subject to any disclaimer, the term of this patent is extended or adjusted under 35 U.S.C. 154(b) by 308 days.

(21) Appl. No.: 16/731,505

(22) Filed: Dec. 31, 2019

(65) Prior Publication Data

US 2021/0201228 A1 Jul. 1, 2021

(51) Int. Cl.
*G06Q 10/0635* (2023.01)
*G06Q 10/10* (2023.01)
(Continued)

(52) U.S. Cl.
CPC ..... *G06Q 10/0635* (2013.01); *G06F 16/9536* (2019.01); *G06N 5/01* (2023.01);
(Continued)

(58) Field of Classification Search
CPC .............. G06Q 10/0635; G06Q 10/10; G06Q 30/0283; G06F 16/9536; G06N 20/00; G06N 5/003; G06N 5/04; G06N 7/005
See application file for complete search history.

(56) References Cited

U.S. PATENT DOCUMENTS 8,417,715 B1 4/2013 Bruckhaus et al.
11,295,330 B2 * 4/2022 Brackertz .......... G06Q 30/0205
(Continued)

FOREIGN PATENT DOCUMENTS

WO WO-2017161237 A1 * 9/2017 ........... G06F 16/955

OTHER PUBLICATIONS

International Searching Authority, International Search Report and Written Opinion, International Application No. PCT/US20/67116, dated Mar. 25, 2021, pp. 1-12.

*Primary Examiner* — Dylan C White
(74) *Attorney, Agent, or Firm* — Hunton Andrews Kurth LLP

(57) ABSTRACT

The invention relates to a computer implemented system and method for identification of comparables. The method may comprise: receiving input data from a plurality of data sources for a comparable, generating labeled training data for a function classifier by labeling historical search results for comparables, generating probabilistic training data for the primary product and service classifiers, training the primary product and service classifiers using the labeled training data and the probabilistic training data, determining the functions, products, services, and risks of the comparable using the corresponding classifiers, receiving attributes of a tested party, applying a scoring algorithm to calculate a similarity score for the comparable, generating a recommendation to accept the comparable, reject the comparable, or give additional scrutiny to determine acceptability, and automatically providing a written justification for the decision to accept or to reject the comparable.

17 Claims, 9 Drawing Sheets

(51) Int. Cl.
  *G06N 5/04*     (2023.01)
  *G06N 7/01*     (2023.01)
  *G06Q 30/0283*  (2023.01)
  *G06F 16/9536*  (2019.01)
  *G06N 20/00*    (2019.01)
  *G06N 5/01*     (2023.01)

(52) U.S. Cl.
  CPC ............... *G06N 5/04* (2013.01); *G06N 7/01* (2023.01); *G06N 20/00* (2019.01); *G06Q 10/10* (2013.01); *G06Q 30/0283* (2013.01)

(56) References Cited

U.S. PATENT DOCUMENTS

| | | | |
|---|---|---|---|
| 2005/0004880 A1* | 1/2005 | Musgrove | G06Q 30/0283 705/400 |
| 2009/0132347 A1* | 5/2009 | Anderson | G06Q 30/02 705/14.52 |
| 2019/0370676 A1 | 12/2019 | Pinckney et al. | |
| 2020/0104869 A1* | 4/2020 | Oh | G06Q 30/0629 |
| 2021/0081865 A1* | 3/2021 | Darmour | G06Q 30/0637 |
| 2021/0342920 A1* | 11/2021 | Keck | G06F 16/9535 |

* cited by examiner

SYSTEM AND METHOD FOR IDENTIFYING COMPARABLES

FIELD OF THE INVENTION

The present invention relates generally to a system and method for identifying comparables, and more particularly to a system and method for identifying comparable companies to support transfer pricing compliance documentation, valuation analyses, and other purposes.

BACKGROUND

Broadly, transfer pricing compliance refers to the rules and regulations that govern the pricing of cross-border transactions between related parties, i.e., enterprises under common ownership or control. In establishing compliance with transfer pricing rules and regulations for a company's intercompany transaction, it is often necessary to research and identify comparable sets of independent (i.e., unrelated) companies whose functions are similar to the studied company's functions, products, or services for each transaction under review. The search and selection of such unrelated comparables for transfer pricing purposes is referred to as transfer pricing benchmarking. Traditionally, these searches are performed by analysts and often require many hours of work due to the need to critically read many company business descriptions. The selection criteria for the comparables is established after conducting a series of company specific interviews that focus on the functions, assets, and risks involved in the specific transaction under consideration. In addition to the large amount of time required, differences in analyst criteria and informed judgement may lead to variances in the final sets created for similar purposes. Moreover, tax authority audits and controversies concerning transfer pricing are not uncommon. These controversies may result in significant adjustments or penalties for a company that fails to properly identify the appropriate comparables and justify its transfer prices.

Attempts have been made to streamline the search and selection process for comparable companies. For example, a commercial database providing company information, such as Amadeus or Compustat, are typically utilized with an interface to allow analysts to enter certain search characteristics of the company of interest (e.g., a manufacturer of automobile parts). The potential comparables may then be presented to the analyst based on their similarities to those characteristics. In practice, however, the comparable selection is influenced by both the analyst's informed judgement and his/her ability to apply the set of criteria consistently in the review of business descriptions, as well as other information available in public sources or licensed databases. Moreover, the analyst needs to spend a significant amount of time in assessing the comparability of each comparable company with the company of interest.

There is a need, therefore, for a system and method to accurately and consistently identify a set of comparable companies for transfer pricing, valuation, and other purposes.

SUMMARY

Systems and methods for identification of comparable companies (sometimes referred to herein as "comparables") are described below. According to one embodiment, the invention relates to a computer-implemented method for identifying comparables. The method may comprise the step of receiving, through an electronic interface, input data from a plurality of electronic data sources for a potential comparable. The electronic data sources may include, for example, a business description from a commercially available database, financial data of the comparable, a SIC or NACE code associated with the comparable, and text obtained from a website of the comparable. Other data sources such as 10-Ks or other publicly available information may be included as well. The method may also include the steps of:

generating and storing in an electronic storage device labeled training data for a function classifier by labeling historical search results for the potential comparables;

generating, with a computer processor, probabilistic training data for product and service classifiers using heuristic rules to generate heuristic labels and an unsupervised label model;

training, with the computer processor, the function classifier, the product classifier, and the service classifier using the labeled training data and the probabilistic training data;

determining a function, product, and service, of the potential comparable using the corresponding function classifier; product classifier, and service classifier;

receiving attributes of a tested party;

automatically executing, with the computer processor, a scoring process to calculate a similarity score for the potential comparable, wherein the similarity score represents a similarity between the potential comparable and company of interest (sometimes referred to herein as the "tested party");

automatically generating, with the computer processor, a recommendation to accept the potential comparable as an acceptable comparable, reject the potential comparable as a rejected comparable, or give additional scrutiny to determine acceptability; and automatically generating, with the computer processor, a written justification for the recommendation to accept or reject the potential comparable, wherein the written justification is specific to the potential comparable that has been analyzed.

The invention also relates to a computer implemented system for identification of comparables and to a computer readable medium (e.g., software) for carrying out the methods described herein.

BRIEF DESCRIPTION OF THE DRAWINGS

In order to facilitate a fuller understanding of the invention, reference is made to the attached drawings. The drawings should not be construed as limiting the invention, but are intended only to illustrate different aspects and embodiments of the invention.

DETAILED DESCRIPTION

Figure 1:
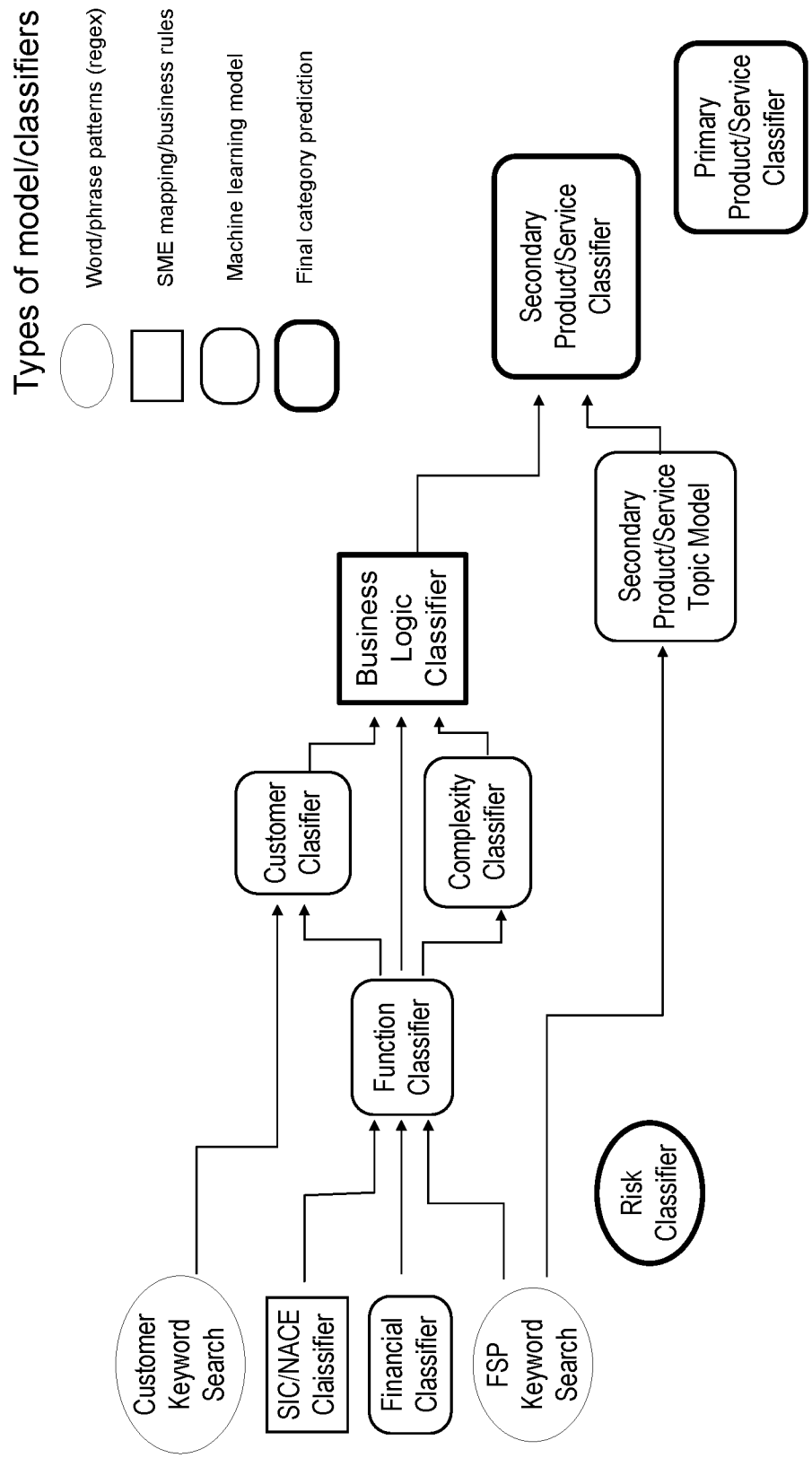
FIG. 1 is a diagram illustrating the relationships between a number of classifiers used in a system for identifying comparables according to one embodiment of the invention.

Exemplary embodiments of the invention will be described in order to illustrate various features of the invention. The embodiments described herein are not intended to be limiting as to the scope of the invention, but rather are intended to provide examples of the components, use, and operation of the invention.

According to one embodiment, a method for identifying comparable companies includes the selection of a set of attributes of the company of interest for a desired use case. As used herein, the company of interest (i.e., the company that needs to benchmark itself against comparables) may be referred to as the "tested party" and the comparable companies may be referred to as "comparables." The "use case" refers to the context for which the comparables are being used. For example, transfer pricing documentation often is a use case where a tested party benchmarks a particular profit level indicator against those of a set of comparables in order to demonstrate compliance with transfer pricing rules and regulations. Planning is another use case in which comparables are used to establish the financial operating targets (e.g., operating margin) of an entity that is part of a corporate restructuring amongst related entities. Tax authority controversy is another use case in which comparables are used to defend a tax payer's position that is under audit or for transaction(s) that is the subject of an Advance Pricing Agreement ("APA") negotiations. Valuation is another use case where certain attributes of a tested party (or guideline company) are used to identify a number of comparables for use in a valuation model. Another use case is in the area of Trade & Customs ("TC"). TC benchmarking analyses are very similar to those involving transfer pricing. By adjusting the screening criteria, the model used for transfer pricing can be adapted for TC analyses, as will be appreciated by those skilled in the art.

The attributes of the tested party may include: functions, products, services, assets, risks, and geography of the tested party, for example. Examples of functions of a tested party may include: value-added wholesaler, low-risk wholesaler, retailer, manufacturer, contract manufacturer, or service provider. Examples of products of the tested party may include product types from a standardized product catalog or a customized product catalog (e.g., chemicals, paper products, household durables, etc.). Examples of services of the tested party may include service types from a standardized services catalog or a customized services catalog. Other attributes of a tested party may include risks (e.g., the risk inherent in developing intellectual property); geography (e.g., the location in which the company operates), customers, industry, etc.

According to one embodiment, the comparable identification system (referred to as the "CI system") may perform automated searching of one or more databases, such as Amadeus or Compustat, that contain descriptions of companies (potential comparables) that sell products or services, or perform functions potentially comparable to the tested party, or have other similarities as defined in local transfer pricing rules and regulations. Within the business description, the CI system also highlights words or phrases related to the functions, products, or services of the comparable. The comparables that are identified by the CI system may be used, for example, to create and/or justify a transfer pricing method adopted by the tested party.

In an embodiment, the CI system may rank the comparables and present those comparables in order of greatest estimated similarity to the tested party. Because the CI system has the capability to process more business descriptions than is practical for a transfer pricing analyst, the CI system may also recommend additional comparables that sell similar products or services or perform similar functions to the tested party that would normally be excluded from consideration, de facto, from current screening methods. The ability to give consideration to many more potential comparables than can be done manually allows the user of the CI system to develop broader and more stable comparable sets as compared to the known manual process. For example, according to one embodiment, the CI system can rank hundreds more potential comparables for a given use case, which is not feasible with existing methods.

According to one embodiment, the method of identifying comparables may include the selection of a combination of input data sources concerning the comparables. The input data sources on the potential comparables may include, for example, a business description (e.g., from the Amadeus and/or Compustat and other licensed databases), financial information or a financial model, SIC/NACE codes, content on the website of the comparable, and other publicly available information (e.g., 10-K). This data is used by the CI system as input, and the CI system is trained to determine attributes of the potential comparable based on this input data. The attributes may comprise, for example, one or more products, services, and functions of the potential comparable.

The CI system may include a number of artificial intelligence models and machine learning models such as classifiers, which together interpret the input data sources to identify the products, services, functions and other attributes of the potential comparables. According to one embodiment, the models and classifiers are trained using labeled training data and synthetic training data. The labeled training data may comprise, for example, input data (e.g., a business description from Compustat, Amadeus, or other licensed database, financial data, SIC/NACE code, and website description of a comparable) that has been labeled by a subject matter expert (SME) as to the potential comparable's attributes (e.g., products, services, and functions). The CI system may also be programmed to generate synthetic training data, as will be described further below.

In an embodiment, in order to evaluate how well the potential comparables aligns with the tested party, the CI system may utilize a combination of data sources, which may include historical financial and search data, financial modeling, and labeled data. In some implementations, the labeled data may include SME labeled data for such entities that sell products or services or perform functions similar to the tested party, which may be a division, subsidiary or affiliate of a larger entity. In an embodiment, the labeled data may include data labeled with accept/reject recommendations as well as products, services or functions. The CI system may also generate and use synthetic training data.

In one embodiment, artificial intelligence, machine learning or deep learning models or classifiers may be implemented in the CI system, which may utilize organizational knowledge resources in the forms of keyword lists and business logic rules to determine the functions, products and services of the potential comparables. These additional data sources and functionalities may enable the CI system to improve the recommendation of the best comparables for the desired use case (e.g., transfer pricing), and to avoid the problem of inadvertently rejecting or omitting good comparables, by using a scoring or ranking system described in further detail below.

According to one embodiment, the CI method may further include the application of one or more noise cancellation algorithms that are applied to descriptions of the comparables. The noise cancellation algorithms may perform noise cancellation on business descriptions that refer to the customers of the potential comparable. For example, if a business description comparable indicates that it is a manufacturer that sells its products to "retailers," the noise cancellation algorithm removes the reference to "retailers" because that term is describing customers of the business comparable (not the function of the business comparable). In addition, the noise cancellation algorithms can be programmed to recognize and remove references to affiliates of the potential comparable (such as the parent company, a holding company, subsidiaries, or sister companies) that are referenced in the business description. The CI system can also be programmed to identify distinct lines of business of a comparable and to treat them separately for purposes of identifying comparables. For example, a potential comparable may have multiple lines of business distinguished by at least a primary function and a secondary function, and in some instances, more additional functions.

The CI method may also include the application of an accept/reject model based on a combination of classifiers for different attributes (e.g., product, service, function, risk) to recommend an accept or reject decision for each potential comparable.

According to another aspect of the invention, training data sets for artificial intelligence, machine learning or deep learning models may be generated by creating synthetic training data, by automatically tagging the data, active learning, reinforcement learning, and creating counter examples. Depending on the use case, the creation of counter examples may involve including or excluding particular meanings of a given word if that word has multiple meanings. For example, in the grocery business, "produce" refers to vegetables and not production. Such counter examples may be included in the training data sets.

According to another embodiment, a scoring model is used to generate a score that represents the similarity between a potential comparable and the tested party. In addition, the CI system may include use of a model that picks the best scoring model among multiple models.

Although the embodiments are described herein primarily with reference to a transfer pricing use case, the principles of the disclosed subject matter may be applicable to various other uses cases or purposes, for example, identification of comparables for the valuation of a company or valuation of its products or services. Depending on the particular use case, the selection of the appropriate combination of attributes and data sources may differ. For example, the attributes for transfer pricing may be different from those for valuation, which may be different for other use cases.

FIG. 1 is a diagram illustrating the overall CI system according to one embodiment of the invention. The figures that follow describe the various components that make up the individual items.

Figure 2:
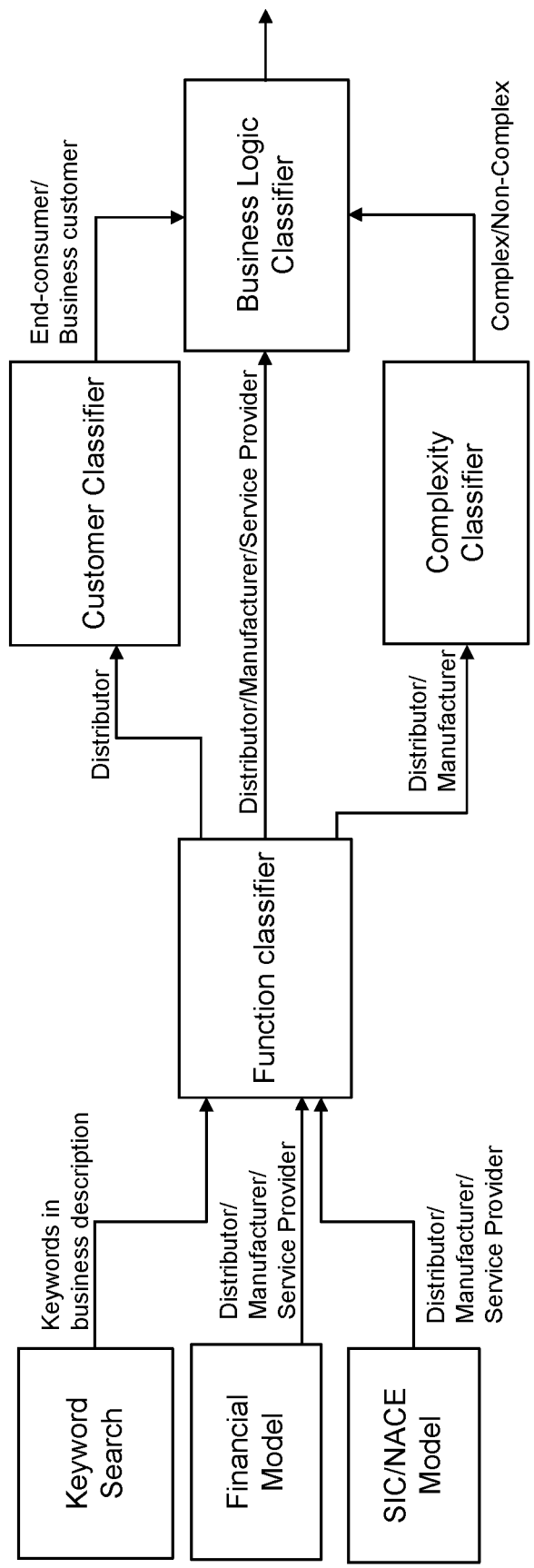
FIG. 2 illustrates an example of a function metaclassifier according to an embodiment of the invention.

FIG. 2 illustrates an example of a flow diagram for a function metaclassifier according to one embodiment of the invention. The function metaclassifier combines multiple sources of information to generate a single prediction as to the function of the comparable. The function metaclassifier can provide the prediction with relatively high confidence based on use of multiple trained classifiers within the function metaclassifier, and multiple input data sources, as shown in FIG. 2. The function metaclassifier, like other components of the CI system, can be provided and operated with computer servers, databases, personal computing devices, and software that are programmed to carry out the methods described herein. The computer servers, databases and personal computing devices can be connected through one or more networks.

As shown in FIG. 2, one source of input data for a comparable is a business description, such as a business description of the comparable available through commercial databases such as Amadeus or Compustat. The CI system may also include a dictionary of keywords that are used to identify certain functions or other attributes of potential comparables. The dictionary of keywords may be created and updated based on expertise of various subject matter experts (SMEs) who provide their input on keywords that are typically associated with a certain function or other attribute. In operation, the CI system uses the dictionary of keywords to identify keywords in the business description associated with various functions or other attributes. This set of keywords is used as input to the function classifier shown in FIG. 2.

The financial model of the comparable is also used as input to the function classifier. The financial model may include data on various financial metrics obtained mainly from the profit and loss (P&L) and balance sheet (BS) of the potential comparable such as various types of assets, various expense items, financial ratios, number of employees, etc. This financial description can be analyzed to ascertain a function of the potential comparable. This results in a certain financial profile providing a strong indication that the potential comparable is a service provider, whereas another financial profile provides a strong indication that the comparable is a manufacturer. For instance, the level of inventory throughout the year is typically minimal for service providers and a statistically important indicator for a manufacturer. This result of the financial model is one of the inputs to the function classifier.

Another input data source on the potential comparable is Standard Industrial Classification (SIC) codes and/or Nomenclature of Economic Activities (NACE) codes, according to one embodiment. The SIC or NACE codes provide a numerical code for each of a range of industries. The CI system uses SME determined mappings of the SIC/NACE codes to functions, products, and services as input to a variety of classifiers. The identified function (e.g., distributor, manufacturer, service provider, etc.) is then fed as input to the broad function classifier and the customer classifier. Additionally, the SIC/NACE codes are used in generating probabilistic labels for the primary product and service models, and contribute to the scoring model by providing additional product and service information.

As shown in FIG. 2, the function classifier generates outputs to a customer classifier, a business logic classifier, and a complexity classifier according to one embodiment of the invention. The types of outputs provided by the function classifier to the customer classifier, business logic classifier and complexity classifier may depend on the type of comparable. For example, the customer classifier may receive an input from the function classifier if the comparable is a distributor, whereas the complexity classifier may receive an input from the function classifier if the comparable is a distributor or manufacturer.

In one embodiment, the business logic classifier may receive an input from the function classifier regardless of whether the comparable is a distributor, manufacturer, or service provider. The customer classifier may provide an output to the business logic classifier to indicate whether the customer of the benchmarked entity is an end consumer or a business customer. The complexity classifier may provide an output to the business logic classifier to indicate whether the benchmarked entity, which may be a distributor or manufacturer, is a complex or non-complex entity.

In an embodiment, the business logic classifier, upon receiving inputs from the function classifier, customer classifier and complexity classifier, generates a final function prediction. The final function prediction indicates the function of the potential comparable, e.g., whether the potential comparable is a value-added wholesaler, a low-risk wholesaler, a retailer, a manufacturer, a contract manufacturer, a service provider, or an entity that performs a combination of the foregoing (multiple functions), for example. According to one embodiment, the customer classifier, function classifier, complexity classifier and business logic classifier comprise models built using SME-provided keyword dictionaries and training data sets produced and reviewed by the SMEs, to ensure that the results originate from consistent and high-quality inputs.

The determination of each potential comparable's function is typically a key factor in the decision as to whether to accept it as an accepted comparable. The function metaclassifier shown in the embodiment in FIG. 2 can facilitate the analyst's decision as to whether to accept a potential comparable as an accepted comparable with a high degree of confidence and consistency.

Figure 3:
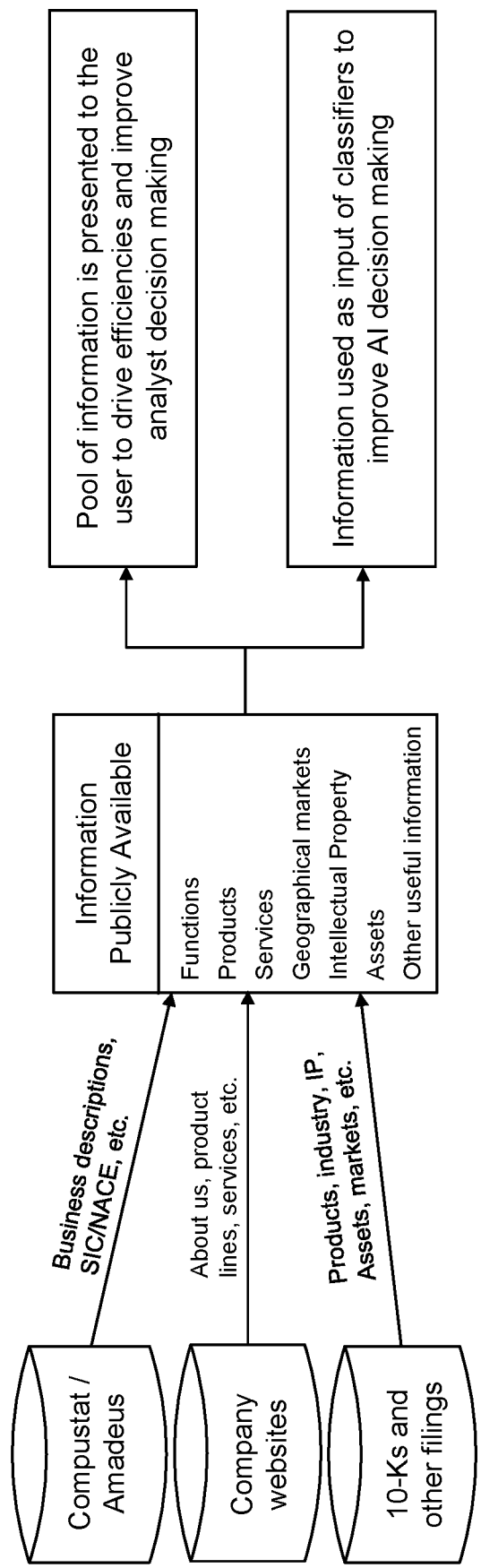
FIG. 3 illustrates an example of the use of multiple data sources for making accept/reject recommendations according to an embodiment of the invention.

FIG. 3 illustrates an example of multiple data sources that can be used for making accept/reject decisions according to one embodiment of the invention. The data sources may include publicly available databases such as the Compustat database, which is a database of financial, statistical and market information on active and inactive global companies throughout the world, the Amadeus database, which is a pan-European database containing financial information on thousands of public and private companies in Europe, and other databases such as Orbis and Osiris. These publicly available databases provide business descriptions, SIC or NACE codes, and additional company data.

In addition, as shown in FIG. 3, company websites may also provide valuable information such as product lines, services, and other information. According to one embodiment, the CI system is programmed to perform web scraping of company websites for comparables to automatically pull the relevant sections of the company website and present them to the analyst in an efficient manner. The information obtained by web scraping also may be relied upon by the classifiers, such as the classifiers described above with reference to FIG. 2, to improve the models for automated analysis.

For publicly traded companies, SEC Form 10-K filings and other government required corporate filings may include information on the company's products, services, industries, markets, intellectual property, tangible and intangible assets, liabilities, and other information. According to one embodiment, the information obtained from 10-K or other public filings may be used as additional valuable information on the functions, products, services, markets, intellectual property, or other information of a potential comparable.

In an embodiment, information that is publicly available may be used for grouping the benchmarked entities according to their functions, products, services, geographical markets, intellectual property, assets, and other useful information for analysis of potential comparables. A pool of information may be presented to the analyst to drive efficiencies and to improve analyst decision making. In addition, such information may be used as inputs to the classifiers, such as the classifiers described above with reference to FIG. 2, to improve the models that generate recommendations to facilitate decision making by the analyst.

Figure 4:
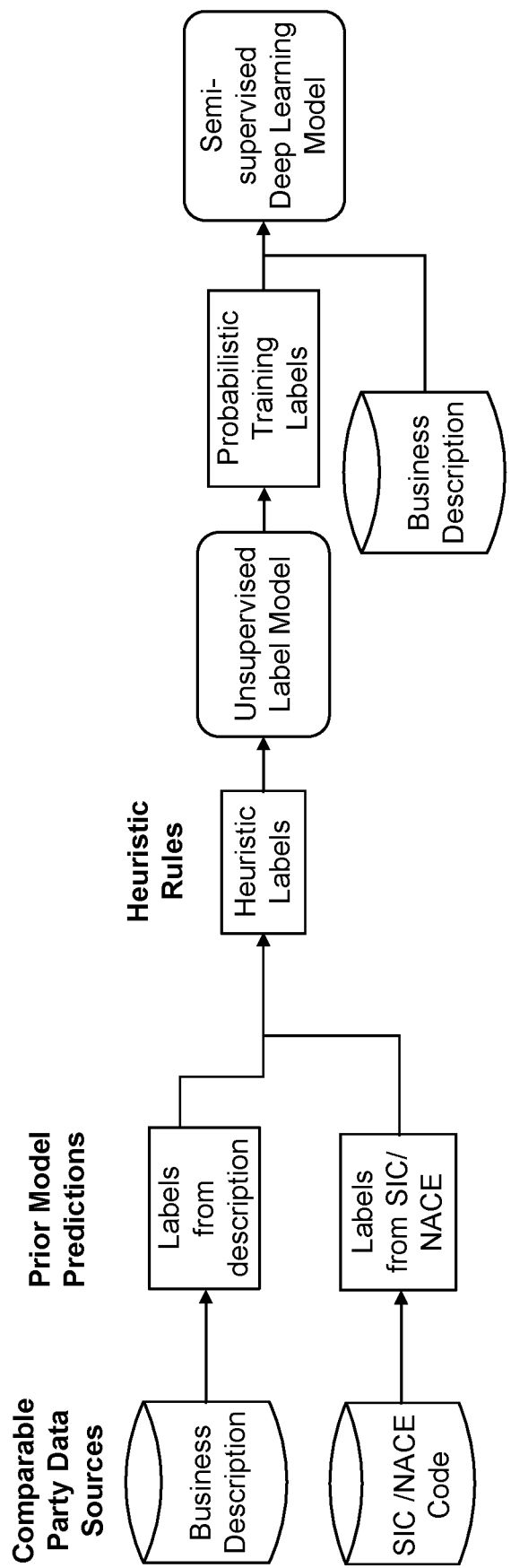
FIG. 4 illustrates an example of a process for generating synthetic training data according to an embodiment of the invention.

FIG. 4 illustrates an example of a process for creating synthetic training data according to an exemplary embodiment of the invention. Large amounts of quality training data can significantly increase the precision, consistency and quality of a model. Hence, the ability to generate synthetic training data provides a significant advantage in this respect. In one embodiment, data sources for potential comparables include keyword counts from business descriptions (e.g., from Amadeus and Compustat), SIC/NACE codes, and secondary product and service model predictions from the business descriptions. The predicted labels and keyword counts from business descriptions and the labels from the SIC/NACE codes may be provided to generate heuristic labels based on heuristic rules, for example. Heuristic rules may be derived from previous experiences with similar problems based on using readily accessible, though loosely applicable, information to control problem solving, even if they are not guaranteed to be perfect or optimal, to provide an immediate solution.

In an embodiment, the heuristic labels generated by the heuristic rules based on the labels from business descriptions and labels from SIC/NACE codes may be provided to an unsupervised label model, which may provide probabilistic training labels for a semi-supervised deep learning model. In an embodiment, a set of business descriptions may be combined with the probabilistic training labels to refine the semi-supervised deep learning model.

In practice, a large amount of high-quality training data can produce better precision, consistency and quality of the deep learning model. In one embodiment, SME expertise may be utilized in combination with the probabilistic training labels based on the business descriptions or SIC/NACE codes from data sources of comparables to create improved synthetic training data. In an embodiment, the semi-supervised deep learning model may also allow for the training of precise new classifiers without having to devote a large amount of time and expense to manual labeling of comparables data.

Figure 5:
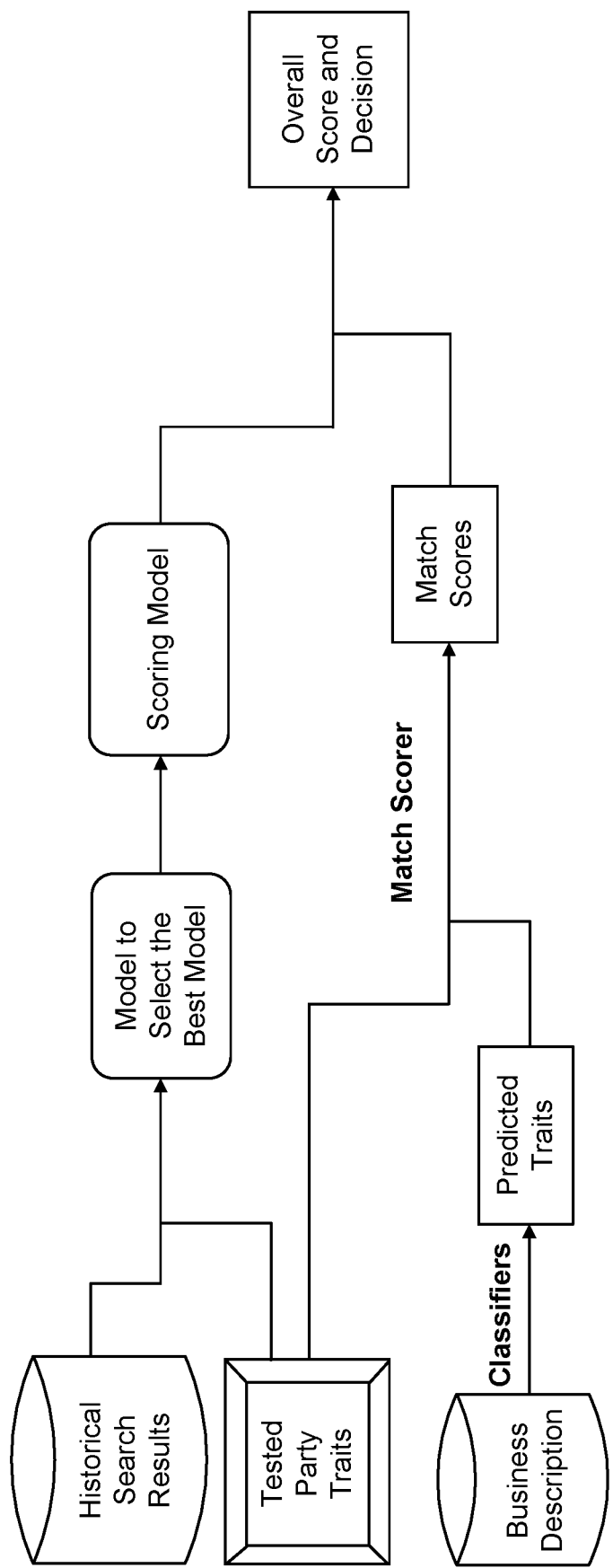
FIG. 5 illustrates an example of a process for selecting a best scoring model according to an embodiment of the invention.

FIG. 5 illustrates an example of a process for selecting a best scoring model according to one embodiment of the invention. Historical search results and tested party attributes may be provided to a model selection model to select the best scoring model. Historical search results may comprise, for example, a list of accepted and rejected comparables from prior searches for potential comparables. Tested party attributes are defined and input by a user of the CI system. The business description of a comparable may be provided to one or more classifiers to generate predicted attributes of the comparable. In one embodiment, the tested party attributes and the predicted attributes are provided to a match scorer to generate a match score. An overall score and an accept/reject recommendation may be generated for the comparable based on the selected best scoring model and the match score generated by the match scorer. For instance, not all attributes will be present for all companies (e.g. a contract manufacturer will not have a primary or secondary service attribute). Similarly, the importance of the different attributes may vary depending on the tested parties (e.g., specific service type may be less relevant for a distributor as compared to a manufacturer). This embodiment of the invention enables extracting relevant patterns from historical search results as to the key attributes to consider and the relative importance of each of them in scoring the comparable companies.

In many practical instances, the accept/reject recommendation for a given comparable may depend on numerous factors such as the function type, transaction type, industry, or the like. Although it may not be feasible to use a one-size-fits-all approach, it is generally desirable to maintain simple scoring models in order to preserve the interpretability of the final results. In an embodiment, reviewed and approved historical searches may be utilized to make an automated selection of the best scoring model among a finite pool of scoring models and optimal weights for the different predictors or attributes for each case. According to this embodiment, the selected best scoring model has the ability to make sophisticated accept/rejection recommendations while providing readily interpretable scoring results.

Figure 6:
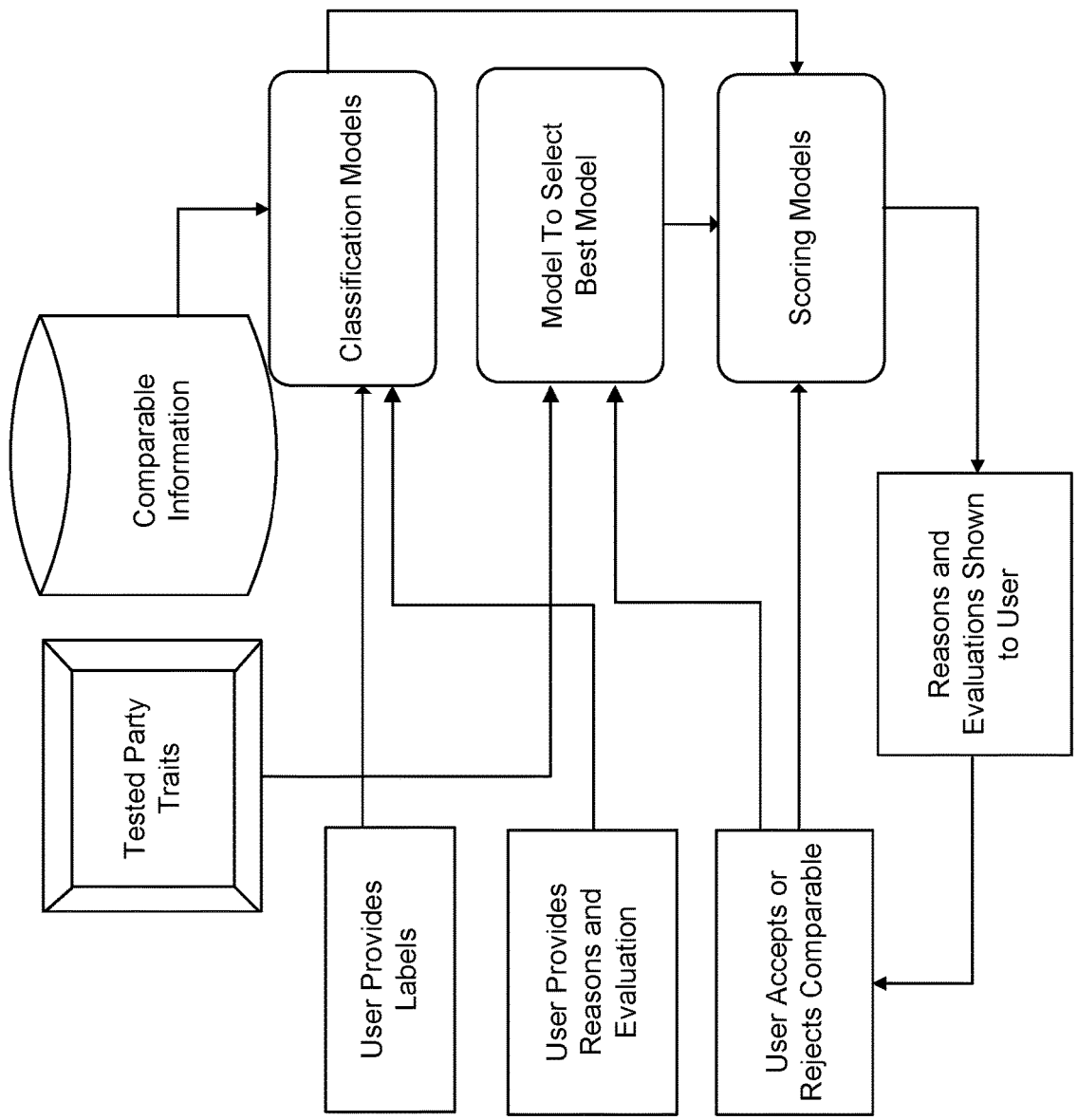
FIG. 6 illustrates an example of a process for active learning and reinforcement learning to improve the scoring models according to an embodiment of the invention.

FIG. 6 illustrates an example of a process for active and reinforcement learning to improve the scoring models for comparables according to one embodiment of the invention. In many practical instances, there may be numerous searches that already have been conducted by analysts on comparables. A large number of the searches may refer to similar types of intercompany transactions. In such instances, the user or analyst may provide labels for the comparables as well as evaluations and reasons therefor to improve the classification models. In one embodiment, inputs from a comparable information database in addition to user-provided labels, evaluations and reasoning may be provided to improve the classification models. The classification models may be improved by generating incremental values from numerous searches conducted on the comparables across public or private networks. In an embodiment, the classification models may be continuously trained and improved as additional data becomes available based on the searches conducted across various networks.

In an embodiment, as the classification models are trained and improved with additional data from user-provided labels, evaluations and reasoning as well as comparable information based on numerous searches conducted across various networks, scoring models for providing accept/reject recommendations may also be improved by such additional data. In an embodiment, the scoring models may provide reasons and evaluations to the user or analyst in addition to accept/reject recommendations. In an embodiment, the model to select the best scoring model may use the tested party's attributes and the user's accept/reject decision to improve itself.

According to one embodiment, the user or analyst may manually accept or reject the potential comparable based on the reasons, evaluations, or accept/reject recommendations provided by the scoring models. The user's decision to accept or reject the comparable is fed back to the pool of scoring models as well as the model to select the best scoring model to further improve those models. Thus, user-provided labels, evaluations, reasoning and accept/reject decisions on comparables may be fed as training data to further improve the classification models, the model to select the best scoring model, and the pool of scoring models using artificial intelligence, machine learning or deep learning techniques.

Figure 7:
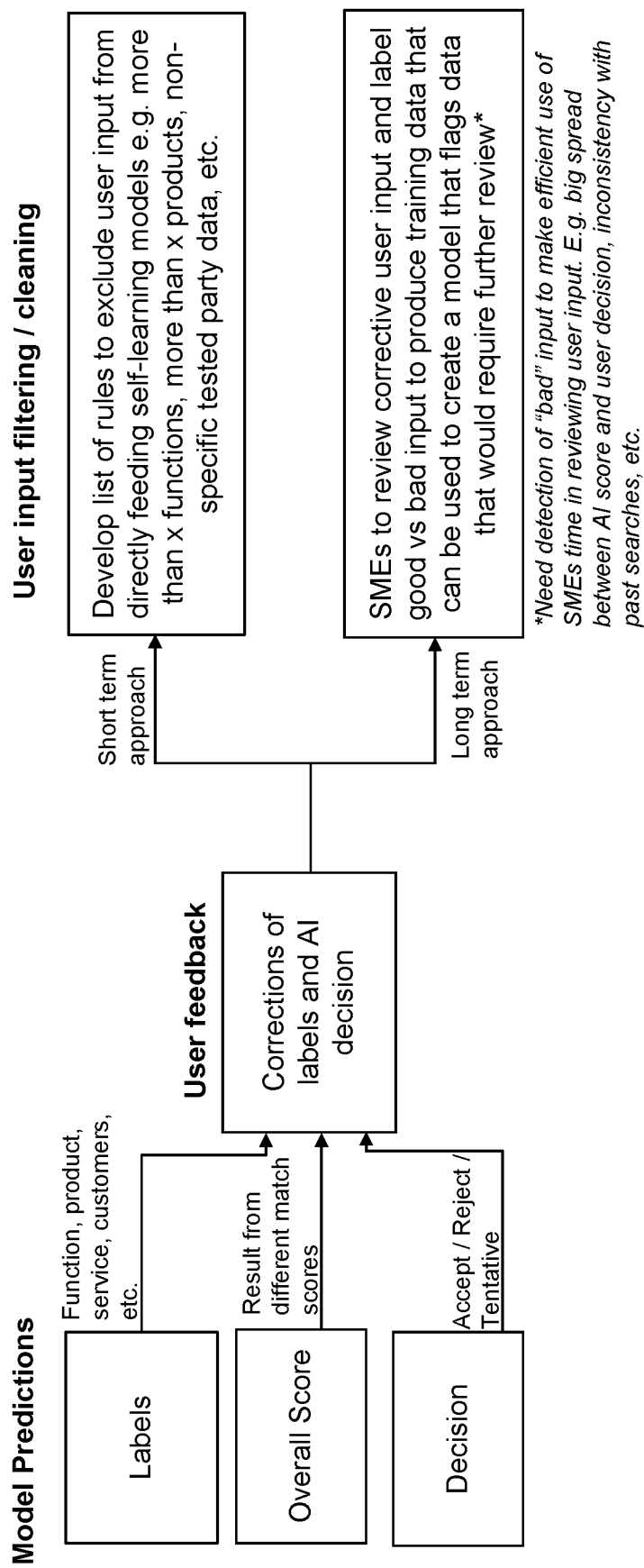
FIG. 7 illustrates an example of a process for learning from high quality data to improve the performance of self-learning models according to an embodiment of the invention.

FIG. 7 illustrates an example of a process for learning from "good data" or high quality data to improve the performance of self-learning models according to one embodiment. This learning process may be applicable to various models such as classification models, scoring models, and the model to select the best scoring model described above. In an embodiment, labels generated by automated model predictions, which may be indicative of functions, products, services, customers, or other attributes of comparables may be provided to the user or analyst for feedback. In an embodiment, the overall score generated by automated model predictions resulting from different match scores also may be provided to the user for feedback. In an embodiment, accept/reject recommendations based on automated model predictions, which are tentative decisions for training purposes, also may be provided to the user for feedback. The user or analyst may manually correct the automatically generated labels and tentative accept/reject recommendations, and provide such manual corrections as feedback to improve the classification models, the scoring models, and the model to select the best scoring model. In an embodiment, filtering or cleaning of user input may be provided before user feedback data is fed into the self-learning models.

Filtering or cleaning of user input may be provided separately for a short-term approach and for a long-term approach. In one embodiment, the short-term approach may include developing a list of rules to exclude user inputs from being directly fed into self-learning models. For example, human input may involve vagueness. A list of rules to exclude certain types of user inputs may be applied to eliminate or reduce such vagueness. For example, if the user input for a given comparable includes too many functions, too many products or non-specific tested data, a list of rules for the short-term approach may limit user input to a controller vocabulary and the ability to choose only a set number of functions, products, or services to describe the tested party.

According to one embodiment, a long-term approach for filtering or cleaning user input may involve SMEs to review and potentially edit the corrective user input to produce training data that can be used to create a model that flags data which would require further review. In one embodiment, "bad" user input as well as "good" user input may be provided to the SME to allow the SME to detect discrepancies when reviewing user input. For example, a "bad" user input may be defined when there is a large spread between the machine-generated matching score based on model predictions and the user's decision.

In an embodiment, the CI system can allow analysts to provide feedback in a wide variety of manners, for example, corrections of labels, recommendations and scores, annotations to the corrections, and free-text field feedback. In many instances, large amounts of finalized searches for tested parties and labeled data may improve the performance of self-learning models. However, analyst-provided input may not always be consistent and there may be some level of noise in such input. Thus short-term and long-term approaches for filtering or cleaning user input may be provided to cancel various types of noise in user-provided corrections or feedbacks, such that self-learning models are fed with consistent, high-quality data for further self-learning.

Figure 8:
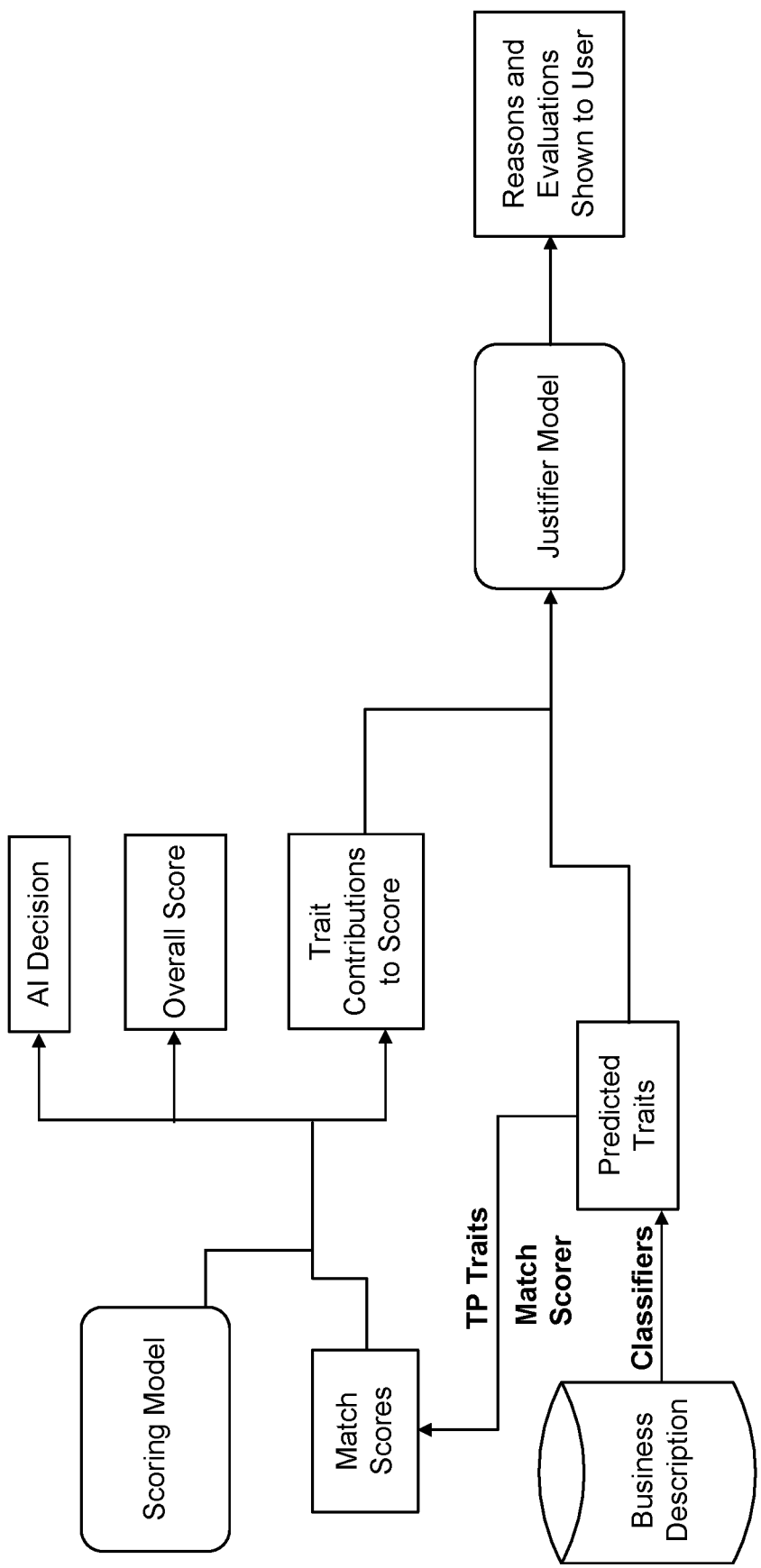
FIG. 8 illustrates an example of a process for justifying an automated recommendation to the user according to an embodiment of the invention.

FIG. 8 illustrates an example of a process for justifying an automated recommendation to the user according to one embodiment of the invention. In one example, if the use case involves transfer pricing, comparable searches may need to be included in transfer pricing reports to support the position of the taxpayer before the tax authorities. In such cases, it is important to have audit-ready traceability of the entire decision-making process for comparable searches that leads to the selection or rejection of the comparables. Thus, if the accept/reject decisions lack interpretability, such decisions might be of limited use to the taxpayer when the taxpayer has to defend transfer pricing before tax authorities.

In one embodiment, a process for justifying automated recommendations of comparables is provided to the user, such that the user may rely on such justifications for selecting the comparables in transfer pricing reports. In this embodiment, business descriptions of comparables may be provided to classifiers to generate predicted attributes. The predicted attributes may be provided to a match scorer to provide match scores for the comparables. A scoring model may be used in conjunction with the match scores to generate outputs including automated accept/reject recommendations, overall scores, and attribute contributions to the scores.

In one embodiment, a justifier model may be provided which receives inputs from the predicted attributes, automated accept/reject recommendations, overall scores, and attribute contributions to the scores, and in response generates reasons and evaluations to be shown to the user. In an embodiment, the justifier model may provide automatic filling of explanations for recommendations for accepting or rejecting comparable entities for transfer pricing purposes. The justifier model may provide interpretable and consistent explanations of the automated recommendations for accepting or rejecting comparables for users and tax authorities. For example, such interpretable explanations may be in the form of text, tables, charts, figures, or any combination thereof.

Figure 9:
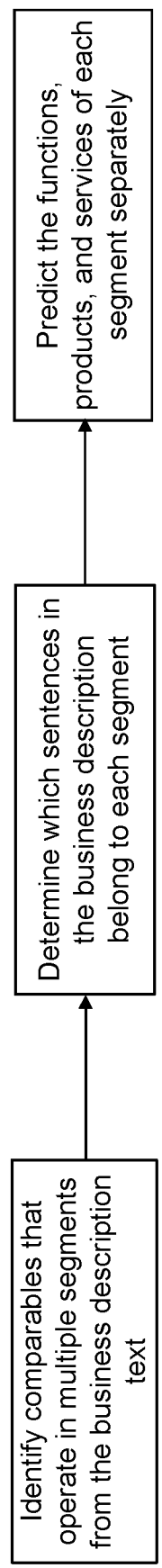
FIG. 9 illustrates an example of a process for classification of companies with distinct lines of business according to an embodiment of the invention.

FIG. 9 illustrates an example of a process for classification of companies with distinct lines of business according to one embodiment. Some companies may operate in multiple segments or carry out a combination of distinct functions. It may be challenging to analyze such companies and provide reliable accept/reject recommendations on comparables because the criteria may depend considerably on specific facts and circumstances. Moreover, in the case of transfer pricing, accept/reject decisions may need to be justified before a tax authority.

According to one embodiment, the process for classifying companies with distinct lines of business may include identifying comparables that operate in multiple segments from the text of business description. For example, the business description text of a comparable may indicate that it operates in three segments—manufacturing, wholesaling and retailing. These segments may be identified and parsed from the business description text.

In an embodiment, once the segments are identified, a determination may be made as to which sentences in the business description text belong to each segment. For example, the business description text may include a sentence describing the manufacturing segment as producing apparel and accessories, a sentence describing the wholesaling segment as distributing the apparel and accessories to retailers across the country, and sentences describing the retailing segment as operating clothing stores that sell clothing and accessories and offering custom design services to consumers.

In one embodiment, after the sentences describing the functions, products or services of each segment are identified, predictions of such functions, products or services of each segment of the company may be made separately. In the above example, based on the sentence describing the manufacturing segment, the function of that segment may be identified as a manufacturer, and the products of that segment may be identified as apparel and accessories. Likewise, based on the sentence describing the wholesaling segment, the function of that segment may be identified as a low-risk wholesaler, and the products of that segment may be identified as apparel and accessories. Similarly, based on the sentences describing the retailing segment, the function of that segment may be identified as a retailer, the products of that segment may be identified as apparel and accessories, and the service of that segment may be identified as design.

Those skilled in the art will appreciate that the diagrams discussed above are merely examples of a system for identifying comparable companies and are not intended to be limiting. Other types and configurations of networks, servers, databases and personal computing devices (e.g., desktop computers, tablet computers, mobile computing devices, smart phones, etc.) may be used with exemplary embodiments of the invention.

Although the foregoing examples show the various embodiments of the invention in one physical configuration, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. The components of the various embodiments may be arranged at any location or locations within a distributed network without affecting the operation of the respective system.

Although examples of servers, databases, and personal computing devices have been described above, exemplary embodiments of the invention may utilize other types of devices whereby a user may interact with a network that transmits and delivers data and information used by the various systems and methods described herein. These devices may further include electronic memory such as a random access memory (RAM), electronically programmable read only memory (EPROM), other computer chip-based memory, a hard drive, or other magnetic, electrical, optical or other media, and other associated components connected over an electronic bus, as will be appreciated by persons skilled in the art.

In some embodiments, the computing devices may be equipped with an integral or connectable liquid crystal display (LCD), electroluminescent display, a light emitting diode (LED), organic light emitting diode (OLED) or another display screen, panel or device for viewing and manipulating files, data and other resources, for instance using a graphical user interface (GUI) or a command line interface (CLI). The personal computing devices may also include a network-enabled appliance or another TCP/IP client or other device.

The servers, databases, and personal computing devices described above may include at least one accelerated processing unit, such as a GPU or FPGA, and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software. The modules described above may comprise software stored in the memory (e.g., non-transitory computer readable medium containing program code instructions executed by the processor) for executing the methods described herein.

Any suitable programming language may be used in accordance with the various embodiments of the invention. For example, the programming language used may include assembly language, Ada, APL, Basic, C Sharp, C++, dBase, Forth, HTML, Android, iOS, .NET, Python, R, Java, Modula-2, Pascal, Prolog, REXX, Visual Basic, and/or JavaScript. Further, it is not necessary that a single type of instructions or single programming language be utilized in conjunction with the operation of the system and method of the invention. Rather, any number of different programming languages may be utilized as is necessary or desirable.

The software, hardware and services described herein may be provided utilizing one or more cloud service models, such as Software-as-a-Service (SaaS), Platform-as-a-Service (PaaS), Infrastructure-as-a-Service (IaaS), and Logging as a Service (LaaS), and/or using one or more deployment models such as public cloud, private cloud, hybrid cloud, and/or community cloud models.

In the system and method of exemplary embodiments of the invention, a variety of "user interfaces" may be utilized to allow a user to interface with the personal computing devices. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor.

Although the embodiments of the invention have been described herein in the context of a particular implementation in a particular environment for a particular purpose, those skilled in the art will recognize that its usefulness is not limited thereto and that the embodiments of the invention can be beneficially implemented in other related environments for similar purposes.

The foregoing description, along with its associated embodiments, has been presented for purposes of illustration only. It is not exhaustive and does not limit the invention to the precise form disclosed. Those skilled in the art may appreciate from the foregoing description that modifications and variations are possible in light of the above teachings or may be acquired from practicing the disclosed embodiments. For example, the steps described need not be performed in the same sequence discussed or with the same degree of separation. Likewise various steps may be omitted, repeated, or combined, as necessary, to achieve the same or similar objectives. Accordingly, the invention is not limited to the above-described embodiments, but instead is defined by the appended claims in light of their full scope of equivalents. The specification and drawings are accordingly to be regarded as an illustrative rather than restrictive sense.

What is claimed is:

1. A computer-implemented method for identifying comparables, the method comprising:
   implementing a machine learning algorithm operating on a computer processor configured to:
   collect, through an electronic interface, input data from a plurality of electronic data sources of a potential comparable for inclusion into a transfer pricing benchmarking set, wherein the transfer pricing benchmarking set is generated by a transfer pricing benchmarking activity which comprises search and selection of unrelated parties to establish a benchmark for the pricing of a cross-border transaction between one or more related parties under common ownership or control, wherein the electronic data sources include: a business description from a commercially available database, financial data of the potential comparable, and a SIC or NACE code associated with the potential comparable;
   determine, via the machine learning algorithm, a function, product, and service of the potential comparable using a corresponding function classifier, product classifier, and service classifier;
   receive, through the electronics interface, attributes of a tested party;
   automatically execute, via the machine learning algorithm, a scoring process to calculate a similarity score for the potential comparable, wherein the similarity score represents a similarity between the potential comparable and the tested party;
   automatically generate, via the machine learning algorithm, a recommendation to accept the potential comparable as an acceptable comparable for transfer pricing benchmarking, reject the potential comparable as a rejected comparable, or subject the potential comparable to further review; and
   generate, via the machine learning algorithm, synthetic training data for the machine learning algorithm by (1) predicting a plurality of labels and keyword counts from the plurality of electronic data sources, (2) generating heuristic labels for the predicted plurality of labels based on a plurality of heuristic rules, the rules based on experience with prior similar problems, and (3) generating probabilistic training labels for a semi-supervised deep learning model; and
   improve the machine learning algorithm by using the synthetic training data and feedback from the automatically generated recommendation to train the machine learning algorithm.

2. The computer-implemented method of claim 1, further comprising:
   automatically generating, with the computer processor, a written justification for the recommendation to accept or reject the potential comparable, wherein the written justification is specific to the potential comparable that has been analyzed.

3. The computer-implemented method of claim 2, wherein the written justification is acceptable for justifying a transfer pricing use case.

4. The computer-implemented method of claim 1, wherein the electronic data sources further include text obtained from a website of the comparable.

5. The computer-implemented method of claim 1, further comprising:

generating, with the computer processor, probabilistic training data for the product classifier and the service classifier; and training, with the computer processor, the product classifier and the service classifier using the probabilistic training data.

6. The computer-implemented method of claim 5, wherein the probabilistic training data is generated using heuristic rules to generate heuristic labels.

7. The computer-implemented method of claim 6, wherein the probabilistic training data is generated using an unsupervised label model.

8. The computer-implemented method of claim 1, further comprising determining a risk of the potential comparable using a corresponding risk classifier.

9. A computer-implemented system for identifying comparables, the system comprising:
   an electronic storage device; and
   a machine learning algorithm operating on a computer processor that is programmed to:
      collect, through an electronic interface, input data from a plurality of electronic data sources of a potential comparable for inclusion into a transfer pricing benchmarking set, wherein the transfer pricing benchmarking set is generated by a transfer pricing benchmarking activity which comprises search and selection of unrelated parties to establish a benchmark for the pricing of a cross-border transaction between one or more related parties under common ownership or control, wherein the electronic data sources include: a business description from a commercially available database, financial data of the potential comparable, and a SIC or NACE code associated with the potential comparable;
      determine a function, product, and service of the potential comparable using a corresponding function classifier; product classifier, and service classifier;
      receive, through the electronic interface, attributes of a tested party;
      automatically execute a scoring process to calculate a similarity score for the potential comparable, wherein the similarity score represents a similarity between the potential comparable and the tested party;
      automatically generate a recommendation to accept the potential comparable as an acceptable comparable for transfer pricing benchmarking, reject the potential comparable as a rejected comparable, or subject the potential comparable to further review;
      generate, via the machine learning algorithm, synthetic training data for the machine learning algorithm by (1) predicting a plurality of labels and keyword counts from the plurality of electronic data sources, (2) generating heuristic labels for the predicted plurality of labels based on a plurality of heuristic rules, the rules based on experience with prior similar problems, and (3) generating probabilistic training labels for a semi-supervised deep learning model; and
      improve the machine learning algorithm by using the synthetic training data and feedback from the automatically generated recommendation to train the machine learning algorithm.

10. The computer-implemented system of claim 9, wherein the computer processor is further programmed to:
   automatically generate a written justification for the recommendation to accept or reject the potential comparable, wherein the written justification is specific to the potential comparable that has been analyzed.

11. The computer-implemented system of claim 10, wherein the written justification is acceptable for justifying a transfer pricing use case.

12. The computer-implemented system of claim 9, wherein the electronic data sources further include text obtained from a website of the comparable.

13. The computer-implemented system of claim 9, wherein the computer processor is further programmed to
   generate probabilistic training data for the product classifier and the service classifier; and
   train the product classifier and the service classifier using the probabilistic training data.

14. The computer-implemented system of claim 13, wherein the probabilistic training data is generated using heuristic rules to generate heuristic labels.

15. The computer-implemented system of claim 14, wherein the probabilistic training data is generated using an unsupervised label model.

16. The computer-implemented system of claim 9, wherein the computer processor is further programmed to determine a risk of the potential comparable using a corresponding risk classifier.

17. A computer-implemented method for identifying comparables, the method comprising:
   implementing a machine learning algorithm operating on a computer processor configured to:
      (a) collect, through an electronic interface, input data from a plurality of electronic data sources of a potential comparable for inclusion into a transfer pricing benchmarking set, wherein the transfer pricing benchmarking set is generated by a transfer pricing benchmarking activity which comprises search and selection of unrelated parties to establish a benchmark for the pricing of a cross-border transaction between one or more related parties under common ownership or control, wherein the electronic data sources include: (i) a business description from a commercially available database, (ii) financial data of the potential comparable, (iii) a SIC or NACE code associated with the potential comparable, and (iv) text obtained from a website of the potential comparable;
      (b) training, with the computer processor, the function classifier, the product classifier, and the service classifier using the labeled training data and the probabilistic training data;
      (c) determine, via the machine learning algorithm, a function, product, and service of the potential comparable using the corresponding function classifier; product classifier, and service classifier;
      (d) receive, through the electronic interface, attributes of a tested party;
      (e) automatically execute, the machine learning algorithm, a scoring process to calculate a similarity score for the potential comparable, wherein the similarity score represents a similarity between the potential comparable and the tested party;
      (f) automatically generate, via the machine learning algorithm, a recommendation to accept the potential comparable as an acceptable comparable for transfer pricing benchmarking or to reject the potential comparable as a rejected comparable; and
      (g) automatically generate, via the machine learning algorithm, a written justification for the recommendation to accept or reject the potential comparable, wherein the written justification is specific to the potential comparable that has been analyzed (h) generate, via the machine learning algorithm, synthetic training data for the machine learning algorithm by (1) predicting a plurality of labels and keyword counts from the plurality of electronic data sources, (2) generating heuristic labels for the predicted plurality of labels based on a plurality of heuristic rules, the rules based on experience with prior similar problems, and (3) generating probabilistic training labels for a semi-supervised deep learning model; and (i) improve the machine learning algorithm by using the synthetic training data and feedback from the automatically generated recommendation to train the machine learning algorithm.

* * * * *

UNITED STATES PATENT AND TRADEMARK OFFICE
CERTIFICATE OF CORRECTION

| | |
|---|---|
| PATENT NO. | : 11,720,842 B2 |
| APPLICATION NO. | : 16/731505 |
| DATED | : August 8, 2023 |
| INVENTOR(S) | : Galginaitis et al. |

It is certified that error appears in the above-identified patent and that said Letters Patent is hereby corrected as shown below:

In the Claims

In Claim 17, Column 16, Lines 55-56, "(e) automatically execute, the machine learning algorithm," should read --"(e) automatically execute, via the machine learning algorithm,--.

Signed and Sealed this
Nineteenth Day of September, 2023

Katherine Kelly Vidal
*Director of the United States Patent and Trademark Office*